2,831,007

PROCESS FOR THE PRODUCTION OF CYCLOPENTADIENE-THALLIUM

Herbert Meister, Marl, Germany, assignor to Chemische Werke Huls Aktiengesellschaft, Marl, Kreis Recklinghausen, Germany, a corporation of Germany No Drawing. Application June 16, 1955
Serial No. 516,037

Claims priority, application Germany June 25, 1954

3 Claims. (Cl. 260—429)

It has been found that cyclopentadiene-thallium is formed when cyclopentadiene and thallous hydroxide are caused to react with each other. The reaction proceeds with the elimination of water. Pure cyclopentadiene can be used but it is preferable to use solutions of cyclopentadiene in alcohols, ethers, etc. or mixtures of cyclopentadiene with other hydrocarbons which may be either unsaturated or saturated. Thus one may use the crude cyclopentadiene-containing benzenes obtained from coal tar and especially advantageously from the so-called low-temperature condensates which are obtained by cooling the gas mixtures produced in acetylene production by the arc process to temperatures of $-40°$ C. and lower. These low-temperature condensates constitute a fertile source of cyclopentadiene, since for example the condensate obtained at $-40°$ C. contains about 18% of cyclopentadiene and the condensate obtained upon subsequent further cooling to $-80°$ C. contains about 4% of cyclopentadiene. The thallous hydroxide is used preferably in aqueous solution. Thallous salts, such as thallous sulfate, may, for example, be mixed in aqueous solution with the required amount of caustic alkali, such as sodium or potassium hydroxide to convert the sulfate to the hydroxide and the resulting solution used directly without separation of the alkali metal salt produced by the reaction. It is further possible to use mixtures which contain, besides thallous hydroxide, also compounds of other metals besides those of the alkali metals. The reaction takes place without difficulty at ordinary, lower and slightly elevated temperatures when the cyclopentadiene or the mixture containing it is brought into intimate contact with the thallous hydroxide solution or the mixture containing it, for example, by shaking, vigorous stirring, or by other suitable known measures.

The cyclopentadiene-thallium produced in the reaction is a faintly yellow precipitate which is less soluble in water than for example thallous iodide, which is known to be only sparingly soluble. The precipitate is best separated from the reaction mixture by decanting or filtering, and because of its low solubility it can be washed with water or with suitable organic solvents, for instance with cold methanol. Cyclopentadiene-thallium can be sublimed without decomposition under vacuum and is stable at room temperature. When treated with dilute aqueous mineral acids, such as sulfuric acid, especially when heated, cyclopentadiene-thallium decomposes with the formation of cyclopentadiene and the thallous salt corresponding to the mineral acid used.

This property of cyclopentadiene-thallium makes it possible to use the described reaction for recovering cyclopentadiene from its solutions or mixtures. Heretofore pure cyclopentadiene has been prepared by fractional distillation of the crude benzene of coal tar or said low-temperature condensates. This distillation is difficult to carry out and gives poor yields because of the tendency of cyclopentadiene to polymerize. By the conversion of the cyclopentadiene into cyclopentadiene-thallium and the decomposition of the cyclopentadiene-thallium into cyclopentadiene and thallous salts it is now possible to obtain cyclopentadiene of high purity and in excellent yields of more than 95%. The process is moreover relatively simple and inexpensive.

It is possible to separate thallium from mixtures containing only small amounts of thallium and larger amounts of other metals by means of cyclopentadiene as cyclopentadiene-thallium and after dissociation of the cyclopentadiene-thallium to obtain it by means of acids as thallous salts.

Since on the one hand no unsaturated hydrocarbons other than cyclopentadiene react with thallium in the manner described, and on the other hand no metal except thallium reacts with cyclopentadiene in the manner described, the reaction can be used for the detection and identification of cyclopentadiene as well as of thallium.

Example 1

A solution of 25 parts by weight of thallous sulfate and 10 parts by weight of potassium hydroxide in 200 parts by weight of water is mixed at ordinary temperature with 5 parts by weight of cyclopentadiene which is dissolved in little methanol and the mixture is shaken well for several minutes. The resulting precipitate is suction-filtered, washed with water and then with little ice-cold methanol, and dried. There are obtained 19.5 parts by weight of cyclopentadiene-thallium, that is, 95% of the theory, referred to the cyclopentadiene used.

33 parts by weight of the obtained cyclopentadiene-thallium are introduced into a distillation flask with 130 parts by weight of a 6% sulfuric acid and the mixture is heated and stirred. At $40-41°$ C. 7.3 parts by weight of cyclopentadiene (90.5% of the theory) pass over. All of the thallium remains in the distillation flask as thallous sulfate, which can be used for another conversion.

Example 2

Into a solution cooled to 0 to $5°$ C. of 30 parts by weight of thallous sulfate and 12 parts by weight of potassium hydroxide in 250 parts by weight of water there are run slowly, in the course of half an hour while stirring, 39.2 parts by weight of the condensate obtained at $-40°$ C. from the gases formed in the arc process for the production of acetylene. Stirring is continued for another half hour. The resulting precipitate is suction-filtered and washed and dried as described in Example 1. There are obtained 28 parts by weight of cyclopentadiene-thallium, corresponding to 17.5% of cyclopentadiene in the condensate.

I claim:

1. Process of producing cyclopentadiene-thallium which comprises intimately mixing cyclopentadiene with an aqueous solution of thallous hydroxide and separating cyclopentadiene-thallium from the resulting reaction mixture.

2. Process of producing cyclopentadiene-thallium which comprises intimately mixing a solution of cyclopentadiene in methanol with an aqueous solution of thallous hydroxide and separating cyclopentadiene-thallium from the resulting reaction mixture.

3. Process as defined in claim 1 in which the cyclopentadiene is reacted with the thallous hydroxide in admixture with a water soluble compound of another metal.

No references cited.